Jan. 12, 1937.  C. E. MURPHY  2,067,677
FRICTION BRAKE AND THE LIKE
Filed Sept. 12, 1933
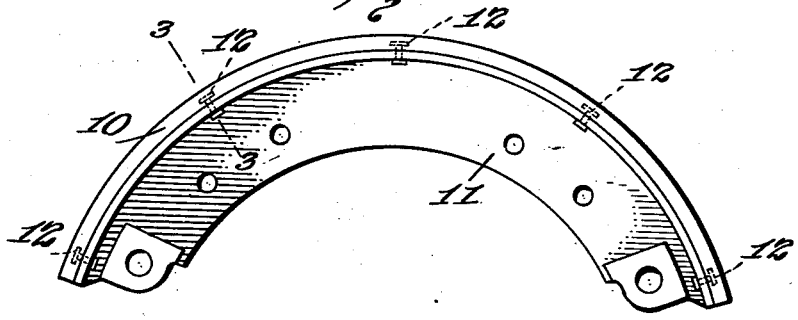
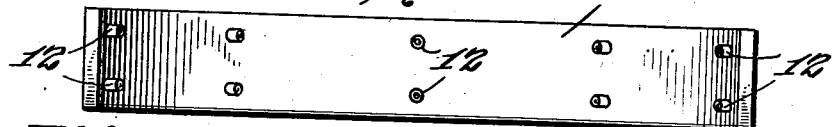
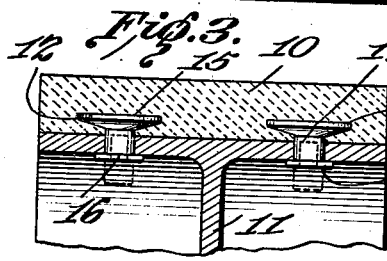  
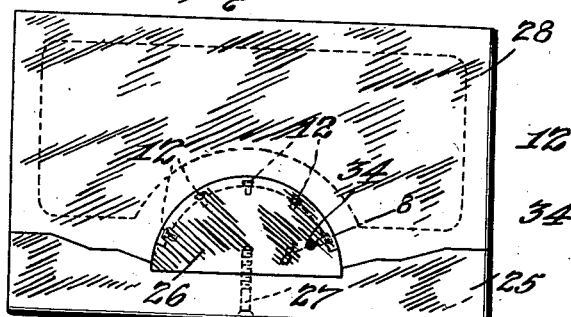 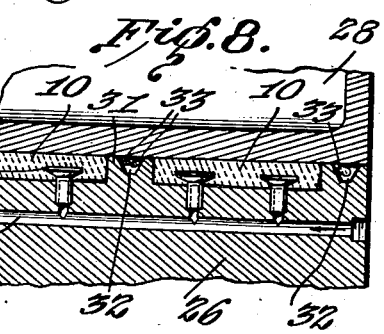
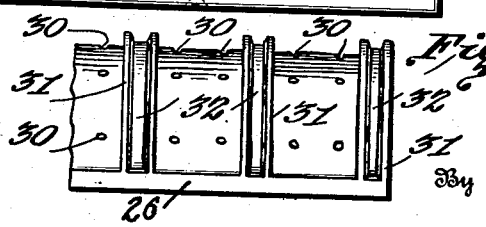
Inventor
CHALMER E. MURPHY
By Lee B. Kemon
his Attorney Patented Jan. 12, 1937

2,067,677

UNITED STATES PATENT OFFICE 2,067,677

FRICTION BRAKE AND THE LIKE

Chalmer E. Murphy, Cuyahoga Falls, Ohio

Application September 12, 1933, Serial No. 689,130

3 Claims. (Cl. 188—234)

This invention relates to friction brakes or clutches, and particularly to brake members of the type employed on automotive vehicles, and friction facings or brake linings therefor.

In apparatus of this character, a braking drum is commonly employed with a movable brake shoe adapted to be forced into contact with the periphery of the braking flange of the drum, the shoe being provided with a durable friction facing of suitable composition. It has been proposed to use a molded facing in the form of a block shaped to conform with the surface of the brake drum, a series of apertures being molded or formed in the block to receive rivets for securing the facing to the brake shoe. In order to avoid scoring of the brake drum or abrasion of the rivets employed in such an arrangement, the heads of the rivets were sunk beneath the outer surface of the facing, forming pockets in which dirt and foreign matter collected. This expedient is not effective because the dust and grit which accumulate in the pockets above the rivet heads acts as a grinding medium, thereby causing scoring of the brake drums.

One object of the present invention is to provide an improved facing of this character with rivets or equivalent anchoring means embedded in the block and permanently fixed thereto, the outer surface of the block being smooth and without apertures or recesses.

Brake shoes or facings which have been used in actual practice contain a large proportion of material, such as asbestos fibres, in order to obtain the necessary wearing qualities and resistance to high temperatures, with a small amount of a resinous binder just sufficient to bond the fibres together. In accordance with the invention, a suitable friction material containing a large proportion of wear-resistant fibres is molded under extremely high pressure around a series of anchoring rivets or the like, the rivets preferably being so treated that they adhere firmly to the facing material.

A still further object of the invention is to provide a preformed or molded friction facing with improved means for firmly attaching the same to a brake shoe or other supporting member, in such a manner that chattering of the brakes in use is prevented. Obviously the invention is not limited to brake apparatus, but is equally applicable to other analogous devices, such as clutches.

For a better understanding of the invention, reference should be had to the accompanying drawing illustrating a preferred embodiment thereof. Referring to the drawing, Figure 1 is a side elevational view of a brake shoe provided with the preformed facing constructed according to the present invention;

Figure 2 is a view of the inside of the facing shown in Figure 1, before mounting upon the brake shoe;

Figure 3 is a detail sectional view taken on the line 3—3 of Figure 1;

Figure 4 is a similar view of a modification;

Figures 5 and 6 illustrate modified forms of rivets which may be employed;

Figure 7 is an elevational view of a mold for forming the brake band; and

Figures 8 and 9 are detail views of portions of the mold shown in Figure 7.

In the embodiment of the invention shown in Figures 1—3, a friction facing 10 in the form of a preformed block or lining is mounted upon and secured to a supporting member 11, such as a brake shoe. For purposes of illustration, a conventional form of brake shoe such as is used in automotive brakes of the internal-expanding type is shown. It will be understood that this friction facing is also applicable to other types of brake shoes, including the external-contracting type, and to other devices such as clutches.

In accordance with the invention, the facing 30 or lining 10 is of any suitable composition, for example including a thermo-plastic binder so that it is adapted to be molded under suitable pressure and temperature conditions; and embedded therein during the molding process are a series of anchors or rivets 12 having shank portions projecting from the inside of the facing and registering with apertures formed in the brake shoe 11, the shank portions of the rivets preferably being tubular as shown, instead of solid. The head portions 15 of the anchors or rivets are formed to facilitate the flow of the lining stock around the same during the molding operation, the head being thin-edged and the underside thereof preferably tapered or beveled, as shown. The diameter of the flattened head is sufficient to insure the firm anchorage of the rivets in the friction facing while it is not so large that the stock will not substantially completely envelop the same during the molding operation.

As clearly shown in Figures 1 and 3, the rivets 12 have their enlarged heads 15 disposed beneath the outer surface of the lining and surrounded by the material thereof so as to be permanently and securely held therein. As indicated in Figure 4, the precise location of the heads of the rivets with respect to the outer surface of the facing may be varied as desired without departing from the scope of the invention. To secure the facing 10 to the brake shoe 11, the tubular shank portions of the rivets are spun or swaged over the inside surface of the brake shoe, as indicated at 16 in Figure 3. As the inner surface of the lining 10 accurately conforms to the outer surface of the brake shoe and the lining is tightly riveted or fastened thereto at a number of spaced points, there is no opening or gap between the lining and the shoe at any point and chattering of the brake lining in service is avoided.

The outstanding advantages of the described construction will be apparent from a consideration of the conditions to which automotive brakes are subjected in service. The heads of the rivets or anchors are located at a considerable depth beneath the wearing surface of the lining, so that the lining is worn out before the rivets are exposed by the wearing away of the lining. Heretofore, the counterboring of the lining to receive the heads of the rivets, at the time the lining was attached to the brake shoe, was necessarily done in an inaccurate and haphazard manner, and usually one or more of the rivets would not be properly countersunk. As soon as the lining was slightly worn, the surface of the lining was of variable hardness and frictional characteristics, causing uneven heating and consequent warping and scoring of the brake drum. Not only is the brake drum damaged under such conditions, but the operation of the brakes is affected. Furthermore, the rivet holes in the brake lining form pockets which collect dirt and foreign matter, and thus cause scoring and excessive wear of the brake drum, which is avoided in the case of a smooth lining.

The friction facing or lining embodying the present invention may be used with the conventional brake shoes which are drilled to receive rivets in accordance with prior practice, but are more easily attached to the shoes. Less skill is required to mount the improved lining in position, since the rivets are embedded in the lining in proper spaced relation.

The use of a comparatively large number of separate rivets or anchors spaced apart along the length of the brake lining insures a tight contact with the entire surface of the brake shoe, which is impossible with a metal attaching strip on account of the stiffness imparted to the lining where such a reinforcing strip is attached thereto or embedded therein. Unless a tight contact of the lining over the entire opposed area of the brake shoe is effected, the brakes will chatter and squeak in service. To avoid this, it is also desirable that the heads of the rivets be tightly held in the lining, which is effectively accomplished in accordance with the invention by embedding the rivets in the lining as described. Counterboring the lining to receive loose rivets is ineffective for this purpose, because of the irregularities in the sizes and shapes of the rivet heads.

In order to increase the adhesion between the rivets 12 and the brake lining 10, particularly if rubber is used in the lining, the rivets may be dipped in a bath, for example of sulphuric acid or copper sulphate. The head of the rivet may also be roughened or modified in any desired manner to increase the bonding of the rivet to the lining. Thus, as shown in Figure 5, a rivet 18 may be used which has the head 19 provided with holes 20; or, as shown in Figure 6, a rivet 21 having a knurled head 22 may be used instead of the rivet 12. Other anchoring devices of this general character may be used if embedded in the lining block as described.

In Figures 7, 8 and 9 is illustrated a mold which may be utilized to form the brake lining 10. The mold consists of a base portion 25, a convex core member 26 secured to the base by a bolt or bolts 27, and a hollow upper portion 28 adapted to be heated to the desired temperature by admitting steam thereto. The convex portion 26 of the mold is provided with one or more recesses conforming to the desired shape and cross-section of the brake block, and in the bottom of said recesses are drilled holes 30 to receive the rivets 12, said holes, as shown in Figure 8, being of somewhat less depth than the length of the shank portions of the rivets. The edges of said recesses are defined by ribs 31 containing overflow grooves 32, the overflow of lining composition being indicated at 33 in Figure 8.

After the rivets 12 and raw lining composition are placed in the mold, the parts of the mold are subjected to heavy pressure in a press or the like, and the composition is heated by flowing steam through the hollow member 28. The plastic composition flows around the heads of the rivets 12, so that they are completely embedded in the brake block. Under the high pressure and elevated temperature to which the molded material is subjected, the content of rubber or other resinous binder is vulcanized or hardened. Where the brake lining is to be used in connection with so-called "centrifuge" brakes, the material is preferably only partially cured, for example for a time approximately two-thirds of the time required for complete vulcanization. In the case of a lining containing vulcanized rubber, the partial cure should be such that no free sulphur is present in the molded block.

In brakes of the "centrifuge" type, the brake drums are lined with cast iron having a rough wearing surface which is exceedingly hard and resistant to wear. The linings on the brake shoes used in brakes of this character often wear out rapidly but if the lining is only partially cured, as described above, when the brakes are applied in service, the lining being somewhat plastic is first shaped to conform to the irregularities of the brake drum. The temperatures and pressures to which the lining is subjected in further use of the brake soon completely vulcanize the lining, but the life of the lining is substantially increased.

In order to loosen the lining block 10 from the mold, an air channel 34 is provided leading through the holes 30 to the underside of the molded block. By admitting compressed air to the channel 34, the lining is loosened and may be readily removed from the mold.

Various modifications in the detailed construction and arrangement of the elements of the friction facing or lining shown and described will occur to those skilled in the art, and are intended to come within the scope of the invention if within the terms of the appended claims.

I claim:

1. A molded composition friction lining or facing for brake shoes and the like comprising a wear-resistant friction material with a thermoplastic binder, said lining having embedded therein and projecting from one side thereof a series of anchor rivets having relatively thin flattened heads with tapered undersides to facilitate the flow of the material around the same during the molding operation, said heads being treated to facilitate adhesion of the material thereto.

2. A molded composition friction lining or facing for brake shoes and the like comprising a wear-resistant friction material with a thermoplastic binder, said lining having embedded therein and projecting from one side thereof, a series of anchor rivets having relatively thin flattened heads with tapered undersides to facilitate the flow of the material around the same during the molding operation, said rivets having the flat heads thereof roughened to facilitate adhesion of the material thereto.

3. A molded composition friction lining or facing for brake shoes and the like comprising a wear-resistant friction material with a thermoplastic binder, said lining having embedded therein and projecting from one side thereof, a series of anchor rivets with hollow shanks and relatively thin flattened heads whose undersides are formed with a taper to facilitate the flow of the material around the same during the molding operation, said rivets being chemically treated and having the flat heads thereof roughened to facilitate adhesion of the material thereto.

CHALMER E. MURPHY.